US008588218B2

(12) United States Patent
Heden et al.

(10) Patent No.: US 8,588,218 B2
(45) Date of Patent: Nov. 19, 2013

(54) CONSIDERING MOBILE STATION CAPABILITY IN NEGOTIATING QUALITY OF SERVICE FOR PACKET SWITCHED SERVICES

(75) Inventors: Karin Heden, Sundbyberg (SE); Ann-Christine Eriksson, Grillby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 80 days.

(21) Appl. No.: 13/584,482

(22) Filed: Aug. 13, 2012

(65) Prior Publication Data

US 2012/0307784 A1   Dec. 6, 2012

Related U.S. Application Data

(63) Continuation of application No. 10/510,470, filed as application No. PCT/SE03/00590 on Apr. 11, 2003, now Pat. No. 8,274,963.

(30) Foreign Application Priority Data

Apr. 15, 2002 (SE) ..................................... 0201143

(51) Int. Cl.
*H04L 12/66* (2006.01)

(52) U.S. Cl.
USPC ........................................... 370/352; 455/428

(58) Field of Classification Search
USPC ............... 455/428, 435, 552.2, 560; 370/352
See application file for complete search history.

(56) References Cited

U.S. PATENT DOCUMENTS 7,010,294 B1 * 3/2006 Pyotsia et al. ................. 455/420
2002/0131395 A1 * 9/2002 Wang ............................. 370/349

* cited by examiner

*Primary Examiner* — Marcos Batista

(57) ABSTRACT

Mobile station capabilities are made available to a radio access network node. The radio access network node determines whether the requested quality of service can be supported by the mobile station in its current cell. These capabilities are taken into account in negotiating a quality of service for a packet flow involving the mobile station.

29 Claims, 5 Drawing Sheets

CONSIDERING MOBILE STATION CAPABILITY IN NEGOTIATING QUALITY OF SERVICE FOR PACKET SWITCHED SERVICES

RELATED APPLICATIONS

This application is a continuation of U.S. patent application Ser. No. 10/510,470 filed Jul. 21, 2005 now U.S. Pat. No. 8,274,963, which is a 371 of International Application No. PCT/SE03/00590, filed Apr. 11, 2003, which claims benefit of SE 0201143-5 filed Apr. 15, 2002, the disclosures of which are fully incorporated herein by reference.

BACKGROUND

The present invention relates to packet data communications in cellular wireless communications.

Wireless packet data communication has become increasingly important. Indeed, with the tremendous increase in Internet users, packet-switched communication will likely become the dominant mode of communication as compared to the circuit-switched voice communications typically employed today. This trend has led to existing circuit-switched systems evolving to incorporate packet-switched communications. One well-known example is the extension of the Global System for Mobile (GSM) communications with General Packet Radio Services (GPRS).

GPRS is a packet switched system that uses the same physical carrier as the GSM cellular communication system and provides the same coverage as GSM. The GPRS radio interface is therefore based on a Time Division Multiple Access (TDMA) system with 200 kHz carriers divided into 8 time slots with Gaussan Minimum Shift Keying (GMSK) modulation. Each time slot typically serves a number of users, and one user can also be allocated more than one time slot to increase throughput over the air. The GPRS specification includes a number of different coding schemes that may be used depending on the quality of the radio carrier.

To further increase the GPRS data throughput, a higher level modulation scheme, 8-Phase Shift Keying (8PSK), is being employed in Enhanced GPRS (EGPRS). Additional coding schemes developed for this 8-PSK offer efficient link adaptation, i.e., adapting coding and/or modulation based on present signal quality.

When running a Packet-Switched (PS) service in a GPRS network, a subscribed Quality of Service (QoS) must be supported. The Quality of Service (QoS) is negotiated when a mobile station requests activation of a Packet Data Protocol (PDP) context which is necessary in order to obtain a packet-switched service. In this PDP context activation process, one of the GPRS nodes engages in packet flow management procedures with the Base Stations System (BSS) of the traditional GSM system. In particular, the BSS creates a Packet Flow Context (ITC) with the requested quality of service for the packet flow involving the mobile station. In particular, the BSS checks whether the requested quality of service can be supported based on the condition of the cell in which the mobile station is currently located.

A problem with this PFC process is that the BSS is unaware of the mobile station's capabilities when negotiating the quality of service for the packet flow context. Absent mobile station capability information, (i.e., the radio capabilities of the mobile a station), the BSS does not know what quality of service the mobile station is capable of supporting. As a result, the quality of service determined by the BSS for the packet flow context for the current cell may not be correct.

For example, if the requested quality of service for a packet flow includes a particular guaranteed bit rate or a particular maximum bit rate, the mobile station must be able to support those particular bit rates. If the BSS accepts too high of a bit rate, that high bit rate may not be supported by the mobile station when the data transmission begins for the packet flow. This may lead to a renegotiation of the quality of service, or the user may perceive an unacceptable quality of service.

For some services, a renegotiation of the quality of service is not acceptable. An example is a streaming service where a bit rate coding is selected at the start of the session. The selected bit rate coding is part of the quality of service requested at the PDP context activation. If the GPRS network accepts that quality of service, the streaming application will start running using the accepted bit rate coding. Because the mobile station can not support that bit rate coding, the BSS must renegotiate the quality of service at the actual start of the data transmission over the radio interface. In some situations, the mobile station application may not be able to accommodate the changed bit rate coding, leading possibly to disconnection of the session.

SUMMARY

Negotiation of quality of service between the mobile packet-switched network and the mobile station includes informing the radio access network (RAN), e.g., a base station system, of one or more mobile station capabilities. The RAN uses the mobile station capabilities in evaluating whether a requested quality of service or a packet communication involving the mobile station can be supported. The mobile station capabilities may include one or more of the following: one or more types of radio access technology supported by the mobile station, a power capability supported by the mobile station, a time slot class supported by the mobile station, and the type of mobile packet radio service supported by the mobile station.

In one example embodiment, the mobile station sends a first message to a packet service node requesting a packet communication including a requested quality of service and the mobile station capability. In response to that first message, the packet service node sends a second message to the RAN that includes the mobile station is capability. The RAN uses that mobile station capability in evaluating whether the requested quality of service can be supported for a packet flow, e.g., when creating a packet flow context. The RAN may also consider other parameters when creating the packet flow context, e.g., a condition of the cell in which the mobile station is located. Once the packet flow context is been established, the base station system allocates radio resources for the packet flow. If there is a subsequent change in radio resources that might warrant or otherwise trigger a change in quality of service for the packet flow, a mobile station capability may also be used in determining whether to change the quality of service for the packet flow.

In another, non-limiting example embodiment, the packet service node is part of a General Packet Radio Services (GPRS) network and is a Serving GPRS Support Node (SGSN). The RAN is a Base Station System (BSS) which is part of a Global System for Mobile communications (GSM). In this example embodiment, the first message is an Activate Packet Data Protocol (PDP) Context Request message, and the second message is a Create Base Station System (BSS) Packet Flow Context message sent from the SGSN to the BSS. Alternatively, the first message could be a routing area update message.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular example embodiments, hardware, techniques, etc. in order to provide a thorough understanding of the present invention. However, it will be apparent to one skilled in the art that the present invention may be practiced in other embodiments that depart from these specific details. For example, while a specific embodiment is described in the context of a GSM GPRS network, those skilled in the art will appreciate that the invention can be implemented in any mobile communication system using other mobile data communications, architectures, and/or protocols. In other instances, detailed descriptions of well-known methods, interfaces, devices, and signaling techniques are omitted so as not to obscure the description with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSP).

Figure 1:
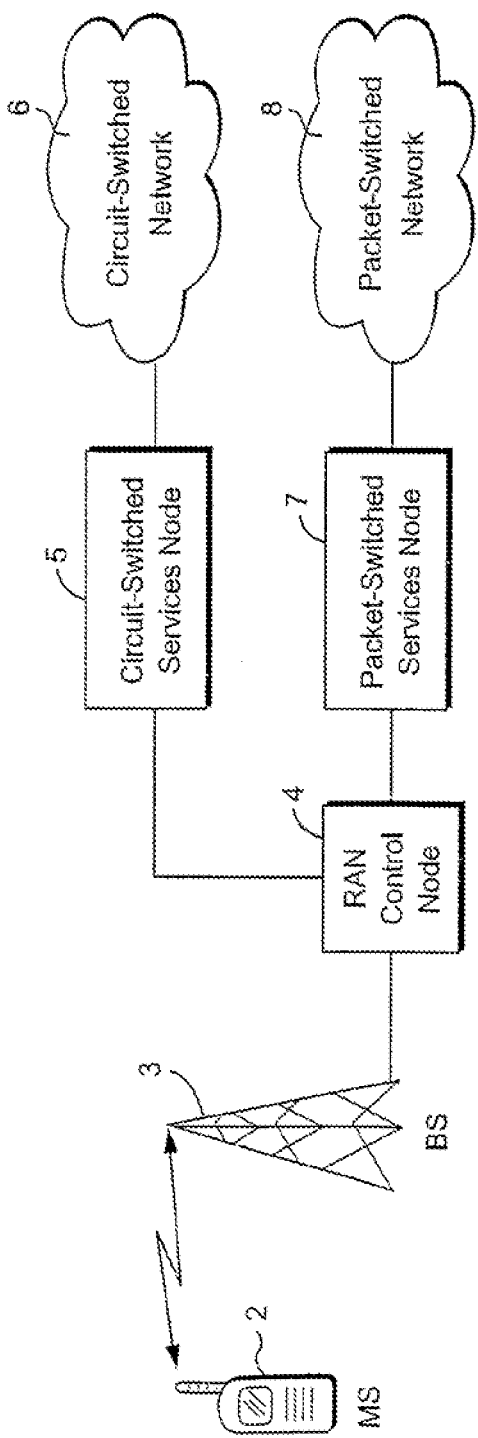
FIG. 1 is a diagram for a mobile communication system that supports both circuit-switched and packet-switched communications.

FIG. 1 illustrates a mobile communication system that includes both circuit-switched and packet-switched mobile services. A Mobile Station (MS) 2 communicates over a radio interface with a Base Station (BS) 3. One or more base stations are coupled to a Radio Access Network (RAN) that includes a RAN control node 4. The RP control node 4 is coupled to a circuit-switched services node 5 and a packet-switched services node 7. The circuit-switched services 5 is coupled to a circuit-switched network 6, and the packet-switched services node 7 is coupled to a packet-switched network 8. When the mobile station 2 requests a packet-switched service, a Packet Data Protocol (PDP) context must be established between the mobile station 2 and the packet-switched services node 7. The term "PDP context" is not meant to be limiting but rather encompasses any initialization procedure which permits a mobile station to conduct packet data communications. When establishing a Packet Data Protocol (PDP) context, the packet-switched services node 7 and the RAN control node 4 both are informed of the capabilities of the mobile station relating to conducting a data packet communication.

Figure 2:
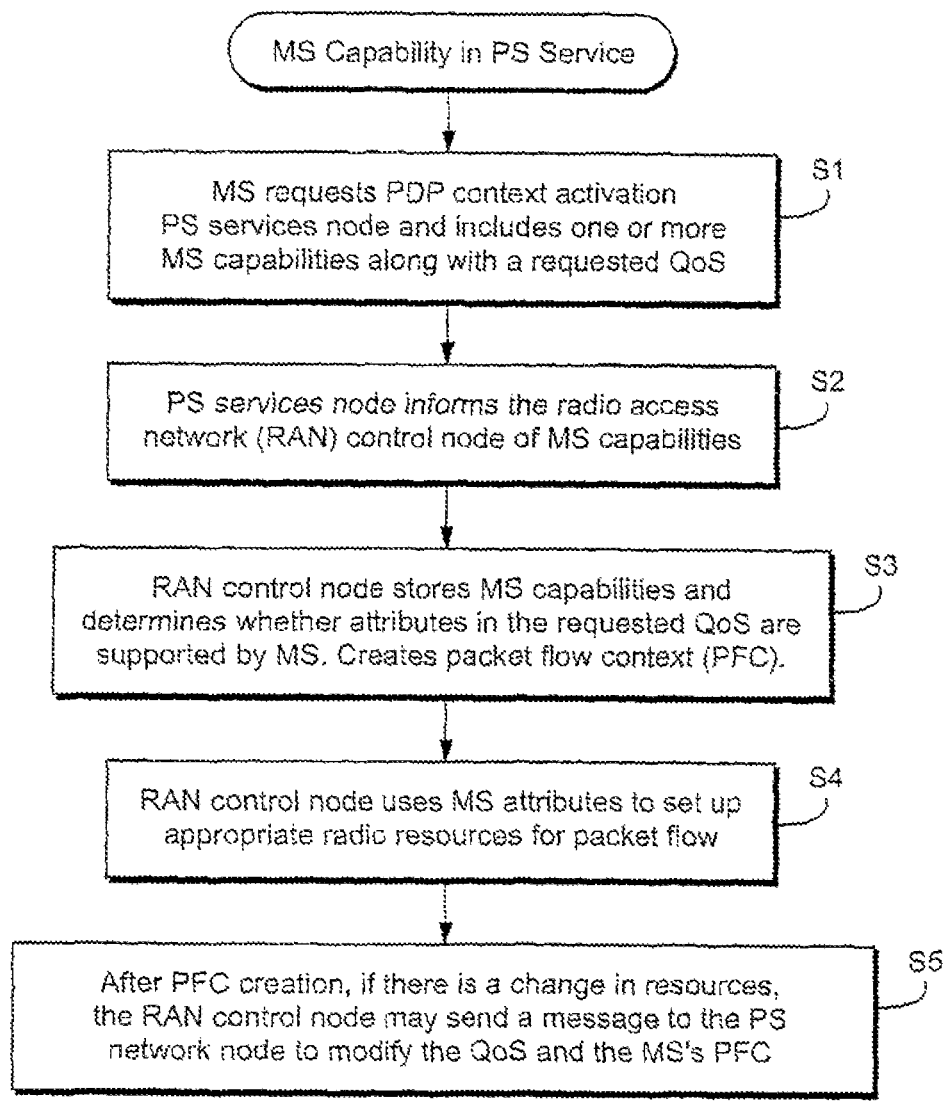
FIG. 2 is a flowchart diagram entitled Mobile Station Capability and Packet-Switched Service.

Reference is now made to the flowchart diagram of FIG. 2 entitled "Mobile Station Capability in Packet-Switched Service." In a first step S1 the mobile station requests a PDP context activation from the packet-switched process service node. In that request, the mobile station includes one or more of its capabilities along with the requested quality of service. The packet-switched service node informs the Radio Access Network (RAN) control node of the mobile station capabilities (Step S2). The RAN control node stores the mobile station capabilities and determines whether attributes in the requested quality of service are supported by the mobile station capabilities. Based on this information, the RAN control node 4 creates a Packet Flow Context (PFC) for this packet flow (step S3). For each packet flow that the mobile station starts, the process described above is repeated. A mobile station can have several packet flows running in parallel. The RAN control node 4 uses the mobile station capabilities to set up appropriate radio resources for the packet flow (step S4). After PFC creation, if there is a change in resources, the RAN control node 4 may send a message to the packet-switched services node to modify the quality of service and the mobile station's packet flow context (step S5). The packet flow context for each packet flow is stored in the RAN control node 4 in accordance with a pre-defined timer. If the timer elapses and the mobile station wants to start a new session, the above-described procedure repeats.

Figure 3:
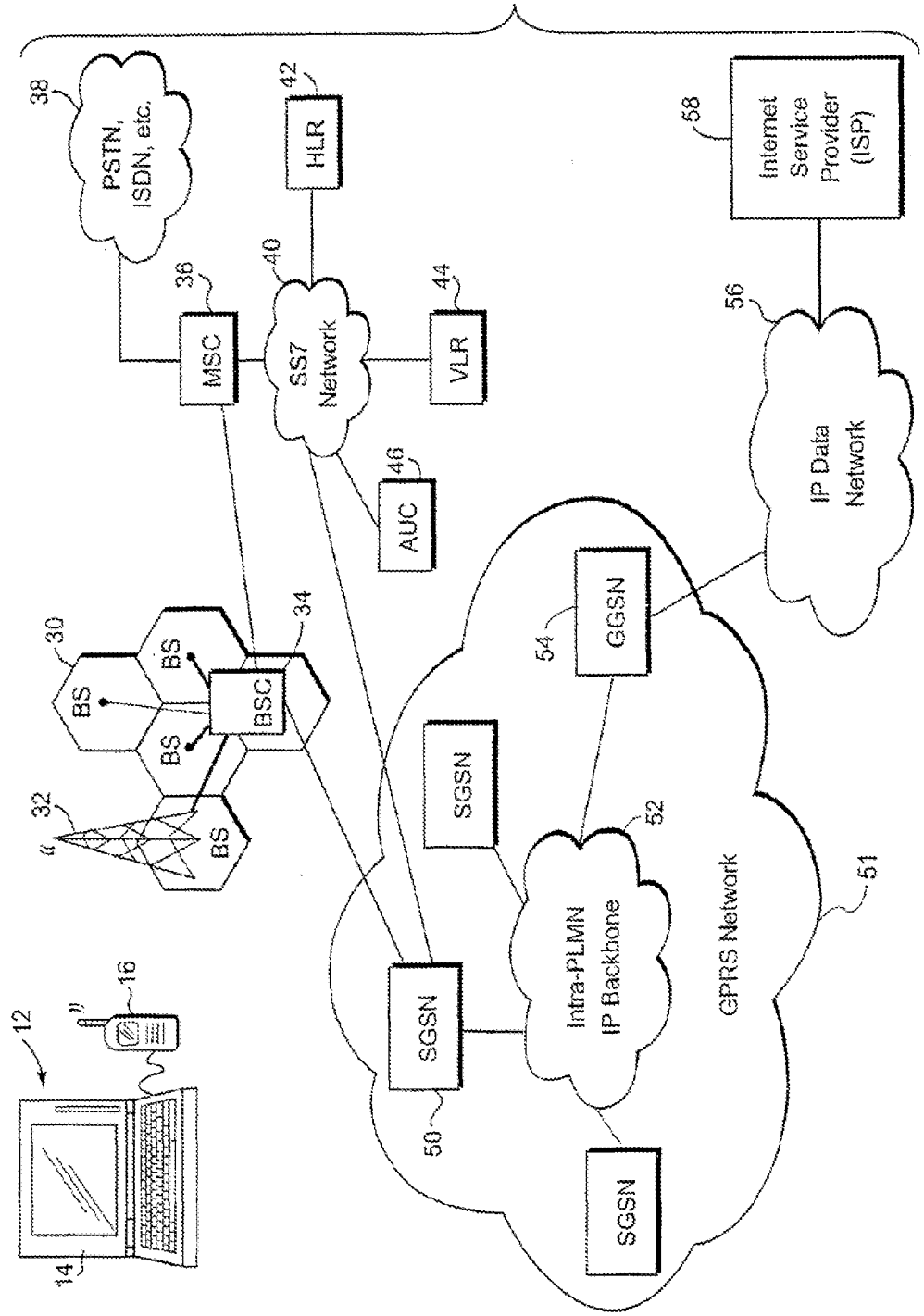
FIG. 3 is a diagram of a GSM/GPRS-based mobile communication system.

Another example, non-limiting embodiment of the present invention is now described in the context of a GSM/GPRS system shown in FIG. 3. A mobile station 12, including a computer terminal 14 and a mobile radio 16, communicates over a radio interface with a base station 32. Each base station 32 is located in a corresponding cell 30. Multiple base stations 32 are connected to a Base Station Controller (BSC) 34 which manages allocation/deallocation of radio resources and controls handovets of mobile stations from one base station to another. A base station controller and its associated base stations are referred to as a base station system (BSS). The BSC 34 is connected to a Mobile Switching Center (MSC) 36 through which circuit-switched connections are set up with other networks such as the Public-Switched Telephone Network (PSTN), Integrated Services Digital Network (ISDN), etc. The MSC 36 is also connected via a Signalling System 7 (SS7) network 40 to a Home Location Register (HLR) 42; a Visitor Location Register (VLR) 44, and an Authentication Center (AUC) 46.

Each BSC 34 connects to a GPRS network 51 including a Serving GPRS Support Node (SGSN) 50 responsible for delivery of packets to mobile stations within its service area. A Gateway GPRS Support Node (GGSN) 54 acts as a logical interface to external data packet networks, such as the IP data network 56. SGSN 50 and GGSN 54 are connected by an intra-PLMN IP backbone 52.

Within the GPRS network 51, packets are encapsulated at an originating GPRS support node and decapsulated at the destination GPRS support node. This encapsulation/decapsulation at the IP level between the SGSN 50 and the GGSN 54 is called "tunneling" in GPRS. The GGSN 54 maintains routing information used to tunnel data packets to the SGSN 50 currently serving the mobile station. A common GPRS Tunnel Protocol (GTP) enables different packet data protocols to be employed even when those protocols are not supported by all the SGSNs. All GPRS user related data needed by the SGSN to perform the routing and data transfer functionality is accessed by the HLR 42 via the SS7 network 40. The HLR stores routing information and maps the mobile to stations identifier to one or more Packet Data Protocol (PDP) addresses as well as mapping each PDP address to one or more GGSN.

Before a mobile host can send packet data to a corresponding external host, like the Internet service provider (ISP) 58, the mobile host 12 has to connect to the GPRS network 51 to make its presence known. It does this by first performing an "attach" procedure and then creating a Packet Data Protocol (PDP) context, which establishes a relationship with a gateway GGSN 54 towards the external network that the mobile host is accessing. The attach procedure is carried out between the mobile host 12 and the SGSN 50 to establish a logical link. As a result, a temporary logical link identity is assigned to the mobile host 12. A PDP context is established between the mobile host and the GGSN 54. The selection of GGSN 54 is based on the name of the external network to be reached. If a mobile station is already attached to the network, the PDP context activation procedure may be initiated by the system.

One or more application flows (sometimes called "routing contexts") may be established for a single PDP context through negotiations with the GGSN 54. An application flow corresponds to a stream of data packets distinguishable as being associated with a particular host application. An example application flow is an electronic mail message from the mobile host to a fixed terminal. Another example application flow is a link to a particular Internet Service Provider (ISP) to download it graphics file from a web site. Both of these application flows are associated with the same mobile host and the same PDP context.

Figure 4:
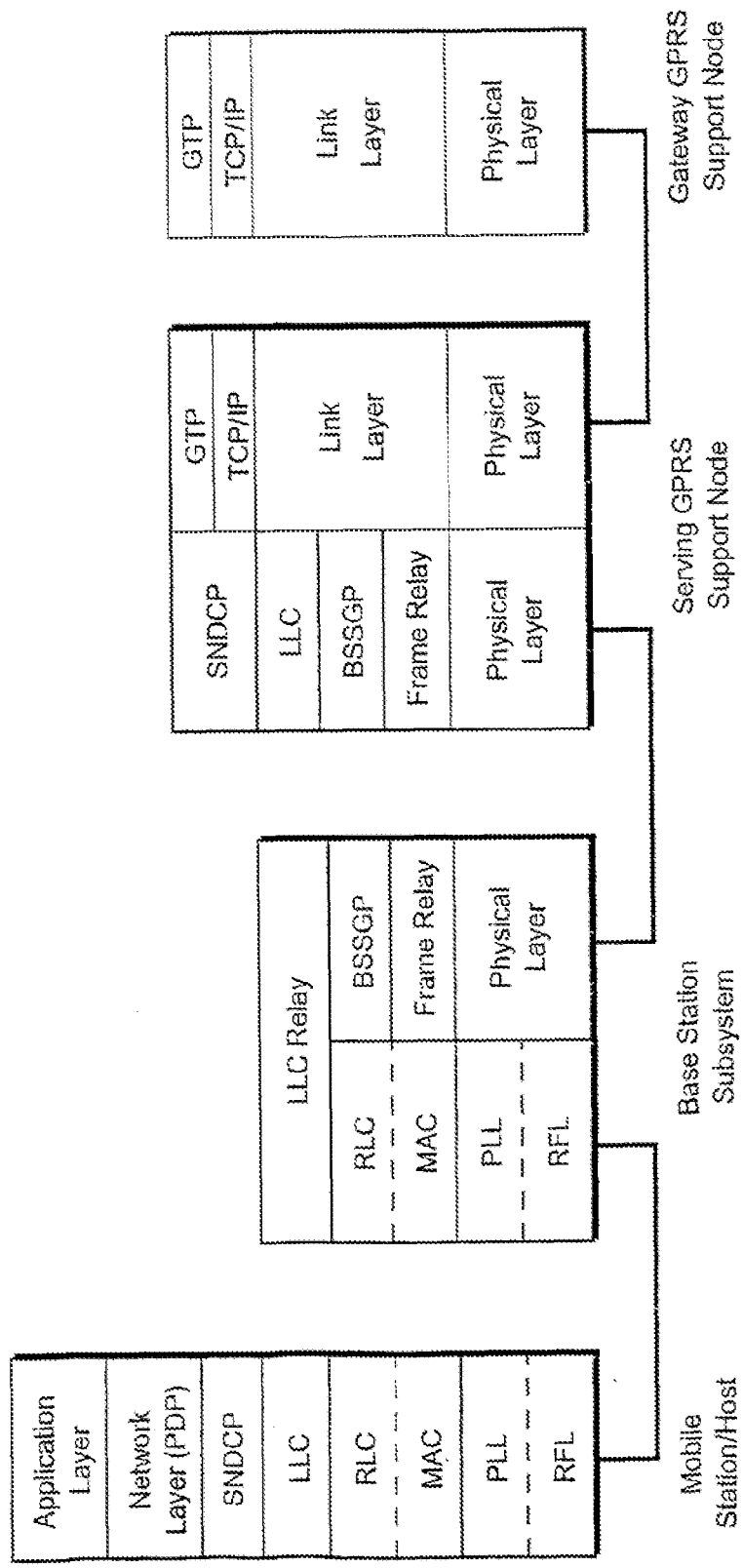
FIG. 4 illustrates various data communication protocols employed between different nodes in the GPBS data communications network shown in FIG. 3.

Packet-switched data communications are based on specific protocol procedures, which are typically separated into different layers. FIG. 4 shows a GPRS "transmission plane" that is modeled with multi-layer protocol stacks. Between the GGSN and the SGSN, the GPRS tunneling protocol (GTP) tunnels the PDUs through the GPRS backbone network 52 by adding routing information. The GTP header contains a tunnel end point identifier for point-to-point and multicast packets as well as a group identity for point-to-multipoint packets. Additionally, a type field that specifies the PDU type and a quality of service profile associated with a PDP context session are included. Below the GTP, the well-known Transmission Control Protocol/User Diagram Protocol (TCP/UDP) and Internet Protocol (IP) are used as the GPRS backbone network layer protocols. Ethernet, frame relay (FR), or asynchronous transfer mode (ATM)-based protocols may be used for the link and physical layers depending on the operator's network architecture.

Between the SGSN and mobile station/host, a SubNetwork Dependent Convergence Protocol (SNDCP) maps network level protocol characteristics onto the underlying logical link control (LLC) and provides functionalities like multiplexing of network layer messages onto a single virtual logical connection, ciphering, segmentation, and compression. A Base Station System GPRS Protocol (BSSGP) is a flow control protocol, which allows the base station system to start and stop PDUs sent by the SGSN. This ensures that the BSS is not flooded by packets in case the radio link capacity is reduced, e.g., because of fading and other adverse conditions. Routing and quality of service information are also conveyed. Quality of Service information is conveyed using Packet Flow Context (PFC) procedures. The PFC procedure may be initiated by the SGSN or the BSS. The SGSN initiates the procedure by sending a Create BSS PFC message to the BSS. The BSS initiates the procedure by sending a Download BSS PFC message to the SGSN. Also, the BSS may request a modification of an existing PFC by sending a Modify BSS PFC message to the SGSN. Frame relay and ATM may be used to relay frames of PDT over the physical layer.

Radio communication between the mobile station and the GPRS network covers physical and data link layer functionality. The physical layer is split up into a physical link sublayer (PLL) and a physical RF sublayer (RFL). RFL performs modulation and demodulation of the physical waveforms and specifies carrier frequencies, radio channel structures, and raw channel data rates. PLL provides services for information transfer over the physical radio channel and includes data unit framing, data coding, and detection/correction of physical medium transmission areas. The data link layer is to separated into two distinct sublayers. The radio link control/medium access control (RLC/MAC) sublayer arbitrates access to the shared physical radio medium between multiple mobile stations and the GPRS network. RLC/MAC multiplexes data and signaling information, performs contention resolution, quality service control, and error handling. The logical link control (LLC) layer operates above the MAC layer and provides a logical link between the mobile host and the SGSN.

Quality of service corresponds to the goodness (quality) with which a certain operation (service) is performed. Certain services like multimedia applications or a simple phone call need guarantees about accuracy, dependability, and speed of transmission. Typically, in data communications, "best efforts" are employed, and no special attention is paid to delay or throughput guarantees. Generally, quality of service parameters can be characterized qualitatively in three services classes including deterministic (used for hard, real-time application), statistical (used for soft real-time applications), and best effort (everything else where no guarantees are made). Quantitative parameters may include throughput (such as the average data rate or peak data rate), reliability, delay, and jitter corresponding to the variation delay between a minimum and maximum delay time that a message experiences.

Figure 5:
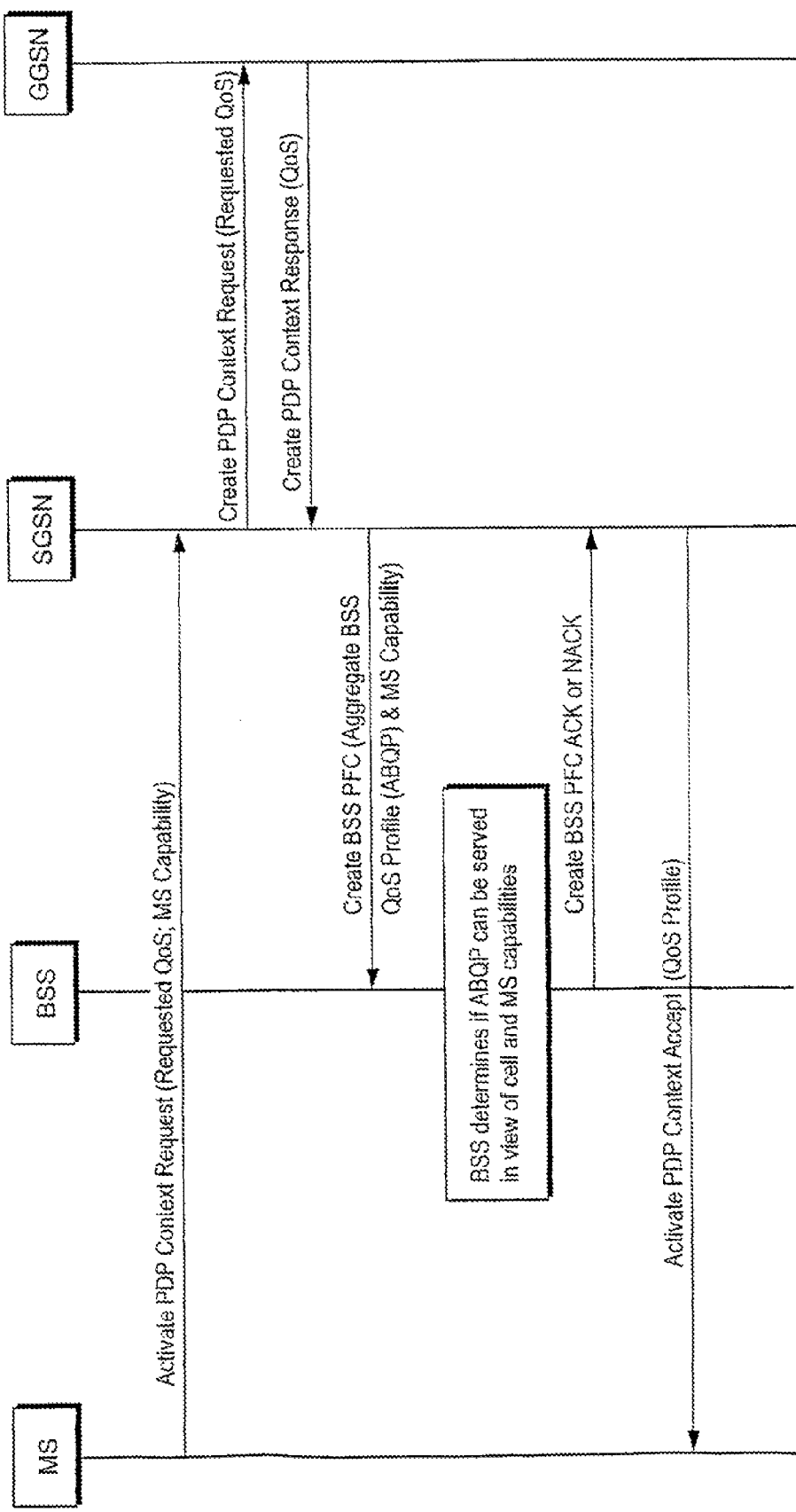
FIG. 5 is an example signaling diagram showing messages communicated between nodes in FIG. 3 for activating a PDP commit for a packet communication involving a mobile station.

Reference is now made to FIG. 5 which illustrates an example PDP context activation signaling flow where the mobile station capabilities are taken into account when the Base Station System (BSS) creates a packet flow context. The Activate PDP Context Request message from the mobile station to the SGSN includes both a requested quality of service and Radio Access Capabilities (RAC) of the mobile station. Alternatively, the mobile station may have already sent the mobile station capabilities in a routing area update message to the SGSN. An example mobile station capability is which access type technologies are supported by the mobile station. For example, different access type technologies might operate in different frequency ranges. Other example RACs may include: the RF power capability of the mobile station, whether the mobile station supports a GPRS or an EGPRS multi-slot class, whether the mobile station supports a GPRS or an EGPRS extended dynamic allocation capability, whether the mobile station supports a Dual Transfer Mode (DTM) GPRS or Dual Transfer Mode EGPRS multi-slot subclass, whether the mobile station supports 8PSK power capability, and whether the mobile station supports a GERAN (GSM EDGE Radio Access Network) feature package 1 including functionality for Extended Uplink Temporary Block Flow (TBF) Mode and Network-Assisted Cell Change. In Dual Transfer Mode, a CS service, e.g., speech, is run in parallel, with a PS service, e.g., web-browsing. The Temporary Block Flow is the packet connection between the mobile station and the Radio Access Network. The Extended Uplink TBF mode maintains the Uplink TBF during inactive periods (no packets to send) in order to be prepared if more data is to be sent. That way, the TBF need not be set up again which saves set up time, e.g., roughly 200 ms. Of course, other mobile station RACs may be used.

The SGSN stores the one or more mobile station RACs and sends a Create PDP Context message to the GGSN along with the requested Quality of Service (QoS). The GGSN returns a Create PDP Context Response message along with the granted quality of service. The SGSN sends a Create BSS Packet Flow Context (PFC) message to the BSS and includes an Aggregate BSS Quality of Service Profile (ABQP) as well as a mobile station RAC. The message contains one element called MS RAC that includes all different RACs of the mobile station. In order to check whether the requested quality of service attributes can be supported, the BSS may perform a call admission control algorithm. For instance, if the SGSN requests the creation of a packet flow context for a streaming bearer with a guaranteed bit rate of 80 kbps, the BSS must check whether this guaranteed bit rate can be ensured. More specifically, the BSS determines the cell in which the PFC is created. That cell is known because the Create BSS PFC message is associated with the cell in which the mobile station is currently located. The BSS also must know the cell capabilities (e.g., GPRS or EGPRS, etc.) and the cell load conditions, which are available in the BSS because the BSS controls the radio resources for au mobile stations in a cell. Finally, the BSS must know the mobile station RAG, (e.g., GPRS or EGPRS, multi-slot class, etc.), to determine what throughput (and/or other functions) can be supported by the mobile station.

Continuing with this example, the BSS checks the radio resources to see whether the guaranteed bit rate may be fulfilled with the indicated GPRS or EGPRS multi-slot class. If there are sufficient available radio resources, the BSS accepts the requested quality of service. If there are not enough radio resources, the BSS may accept the PFC but with a modified lower quality of service, or may not accept the PFC at all. The BSS sends a BSS PFC Acknowledgement (ACK) or Negative ACK (NACK) to the SGSN. The SGSN completes the PDP context messaging process by sending an Activate PDP Context Accept message to the mobile station with the determined quality of service profile. If after the PFC is created, there is a radio resource change, e.g., more radio resources are available due to less circuit-switched traffic or released packet-switched connections, the BSS may send a modified BSS PFC to the SGSN to upgrade/downgrade the quality of service. The mobile station radio access capability may be used to determine the appropriateness of such an upgrade or downgrade quality of service.

There are several advantages associated with including mobile station radio access capabilities in the PFC creation procedure. For example, an accurate PFC can be created from the beginning of a session because all the facts needed such as mobile station radio access capabilities, cell capabilities, current cell load condition, and the requested Quality of Service are known by the BSS. The response message to the SGSN and the mobile station includes the level of Quality of Service that it is possible to achieve in view of the mobile station capabilities. This gives the rest of the system; (e.g., applications), a chance to adapt so that the end-user receives a service in accordance with the achievable Quality of Service. Since an accurate PFC is created from the start, there is less re-negotiation, and hence, a lower signaling load on the interface between the SGSN and the BSS. By storing the mobile station radio access capabilities in the BSS, any re-negotiation of the Quality of Service during an ongoing session can be made in a correct way.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for use in a mobile communications system where a mobile station communicates packet data over a radio interface with a radio base station system coupled to a packet node, the method comprising:
   the mobile station sending a first message to the packet node requesting a packet communication, the first message including a packet flow having a requested quality of service and a mobile station capability;
   responsive to receiving the first message, the packet node sending a second message to the base station system including the mobile station capability, and
   the base station system using the mobile station capability in evaluating whether the requested quality of service can be supported for the packet flow and, if the requested quality of service can be supported, creating the packet flow using the mobile station capability.

2. The method in claim 1, further comprising:
   the base station system creating a packet flow context for the packet flow considering a condition of a cell area in which the mobile station is located.

3. The method in claim 2, further comprising:
   allocating radio resources for the packet flow based on the cell condition and the mobile station capability.

4. The method in claim 3, further comprising:
   detecting a change in the radio resources:
   sending a message to change the requested quality of service for the packet flow; and
   using the mobile station capability in determining whether to change the requested quality of service for the packet flow.

5. The method in claim 1, wherein the mobile station capability includes one or more of the following:
   one or more types of radio access technology supported by the mobile station,
   a power capability supported by the mobile station,
   a time slot class supported by the mobile station, and
   a type of mobile packet radio service supported by the mobile station.

6. The method in claim 1, wherein the packet node is part of a General Packet Radio Services (GPRS) network and is a Serving GPRS Support Node (SGSN) and the base station system is part of a Global System for Mobile communications (GSM) network.

7. The method in claim 6, wherein the first message is an Activate Packet Data Protocol (POP) Context Request message and the second message is a Create Base Station System packet Flow Context message sent from the SGSN to the base station system.

8. The method in claim 6, wherein the mobile station capability includes one or more of the following:
   one or more types of radio access technology supported by the mobile station,
   a power capability supported by the mobile station,
   a time slot class supported by the mobile station, a type of mobile packet radio service supported by the mobile station including whether the mobile station supports an enhanced GPRS capability or a GPRS capability, a multi-slot class type supported by the mobile station, an extended dynamic allocation capability supported by the mobile station, a multi-slot sub-class capability supported by the mobile station, and a GSM Enhanced Data rates for Global Evolution (EDGE) Radio Access Network (GERAN) feature package 1 including functionality for Extended Uplink Temporary Block Flow (TBF) Mode and Network-Assisted Cell Change supported by the mobile station.

9. The method in claim 6, wherein the first message is a routing area update message.

10. The method in claim 6, wherein the method is initiated by the base station system requesting a download of a Packet Flow Context (PFC) Create message.

11. The method in claim 6, wherein the method is initiated by a Gateway GPRS Support Node (GGSN) establishing a packet connection with the mobile station.

12. The method in claim 1, wherein the method is initiated by the packet node sending a message to the mobile station requesting the packet communication.

13. A mobile communications system, comprising:
a radio access network including
a control node,
a packet node coupled to the control node, and
a mobile station configured to communicate over a radio interface with the radio access network, the mobile station being further configured to send a first message to the packet node via the radio access network requesting a packet communication including a packet flow having a requested quality of service and a mobile station capability:
the packet node being configured to send a second message to the control node following the first message, the second message including the mobile station capability; and
the control node being configured to use the mobile station capability in evaluating whether the requested quality of service can be supported for the packet flow and, if the requested quality of service can be supported, create the packet flow using the mobile station capability.

14. The mobile communications system in claim 13, wherein the control node is configured to create a packet flow context for the packet flow using the mobile station capability.

15. The mobile communications system in claim 14, wherein the control node is configured to create the packet flow context for the packet flow considering a condition of a cell area in which the mobile station is located.

16. The mobile communications system in claim 15, wherein the control node is configured to allocate radio resources for the packet flow based on the cell condition and the mobile station capability.

17. The mobile communications system in claim 16, wherein the control node is configured to detect a change in the radio resources, send a message to change the requested quality of service for the packet flow, and use the mobile station capability in determining whether to change the requested quality of service for the packet flow.

18. The mobile communications system in claim 13, wherein the mobile station capability includes one or more of the following:

one or more types of access technology supported by the mobile station, a power capability supported by the mobile station, a time slot class supported by the mobile station, and a type of mobile packet radio service supported by the mobile station.

19. The mobile communications system in claim 13, wherein the packet node is part of a General Packet Radio Services (GPRS) network and is a Serving GPRS Support Node (SGSN) and the control node is a radio Base Station Controller (BSC) in a Base Station System (BSS).

20. The mobile communications system in claim 19, wherein the first message is an Activate Packet Data Protocol (PDP) Context Request message and the second message is a Create Base Station System Packet Flow Context message sent from the SGSN to the BSS.

21. The mobile communications system in claim 19, wherein the mobile station capability includes one or more of the following:

one or more types of access technology supported by the mobile station, a power capability supported by the mobile station, a time slot class supported by the mobile station, a type of mobile packet radio service supported by the mobile station including whether the mobile station supports an enhanced GPRS capability or a GPRS capability, a multi-slot class type supported by the mobile station, an extended dynamic allocation capability supported by the mobile station, a multi-slot sub-class capability supported by the mobile station, and a GSM Enhanced Data rates for Global Evolution (EDGE) Radio Access Network (GERAN) feature package 1 including functionality for Extended Uplink Temporary Block Flow (TBF) Mode and Network-Assisted Cell Change supported by the mobile station.

22. The mobile communications system in claim 19, wherein the first message is a Download BSS Packet Flow Context (PFC) message sent by the BSS.

23. The mobile communications system in claim 19, wherein the first message is a Request PDP context activation sent by the Serving GPRS Support Node (SGSN).

24. The mobile communications system in claim 13, wherein the first message is a routing area update message.

25. The mobile communications system in claim 13, wherein the packet node is configured to send a message to the mobile station via the radio access network requesting the packet communication.

26. An apparatus for use in a mobile communications system where a mobile station communicates packet data over a radio interface with a radio access network (RAN), comprising:

a RAN node and
a packet node coupled to the RAN node having information about a mobile station capability, the packet node being configured to send a message to the RAN node including the mobile station capability, and the RAN node being configured to use the mobile station capability in evaluating whether a quality of service can be supported for a packet flow associated with the mobile station and, if the quality of service can be supported, create the packet flow using the mobile station capability.

27. The apparatus in claim 26, wherein the packet node is part of a General Packet Radio Services (GPRS) network and is a Serving GPRS Support Node (SGSN) and the control node is a radio Base Station Controller (BSC) in a Base Station System (BSS).

28. The apparatus in claim 27, wherein the SGSN is configured to receive an Activate Packet Data Protocol (PDP) Context Request that includes the mobile station capability and the message is a Create Base Station System Packet Flow Context message sent from the SGSN to the BSS.

29. The apparatus in claim 27, wherein the mobile station capability includes one or more of the following:
- one or more types of access technology supported by the mobile station,
- a power capability supported by the mobile station,
- a time slot class supported by the mobile station,
- a type of mobile packet radio service supported by the mobile station including whether the mobile station supports an enhanced GPRS capability or a GPRS capability,
- a multi-slot class type supported by the mobile station,
- an extended dynamic allocation capability supported by the mobile station,
- a multi-slot sub-class capability supported by the mobile station, and
- a GSM Enhanced Data rates for Global Evolution (EDGE) Radio Access Network (GERAN) feature package 1 including functionality for Extended Uplink Temporary Block Flow (TBF) Mode and Network-Assisted Cell Change supported by the mobile station.

* * * * *

UNITED STATES PATENT AND TRADEMARK OFFICE
CERTIFICATE OF CORRECTION

PATENT NO.          : 8,588,218 B2
APPLICATION NO.     : 13/584482
DATED               : November 19, 2013
INVENTOR(S)         : Heden et al.

Page 1 of 1

It is certified that error appears in the above-identified patent and that said Letters Patent is hereby corrected as shown below:

In the Claims

In Column 8, Line 38, in Claim 4, delete "resources:" and insert -- resources; --, therefor.

In Column 8, Line 58, in Claim 7, delete "(POP)" and insert -- (PDP) --, therefor.

Signed and Sealed this
Sixth Day of May, 2014

Michelle K. Lee
*Deputy Director of the United States Patent and Trademark Office*